June 16, 1942.  B. B. SIMCOX  2,286,584
VENTILATOR FOR AIRPLANES AND THE LIKE
Filed Sept. 11, 1940
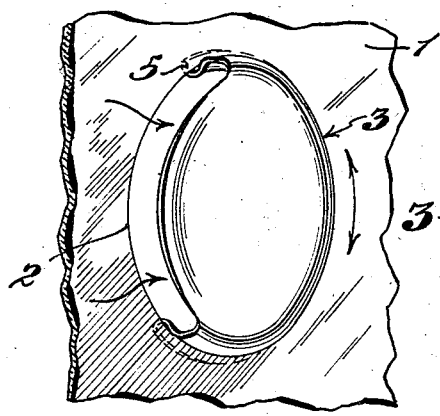
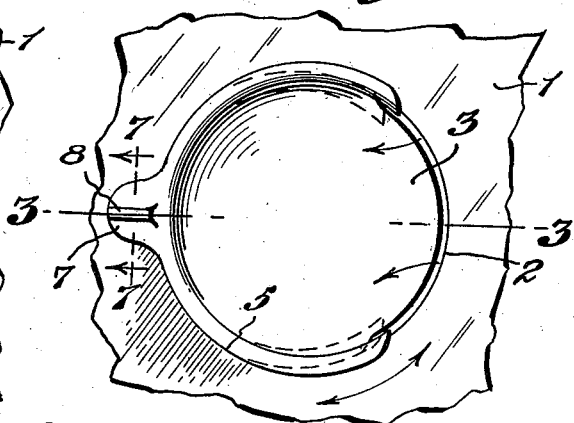
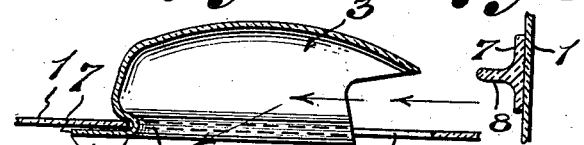
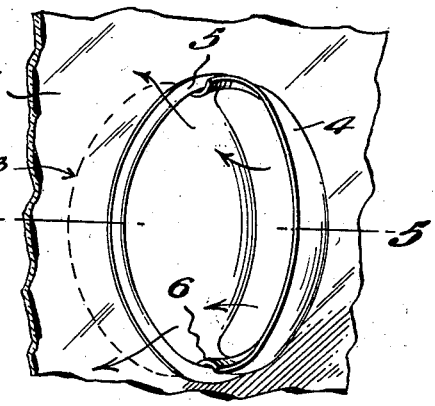
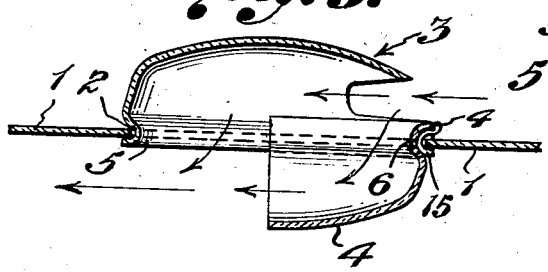
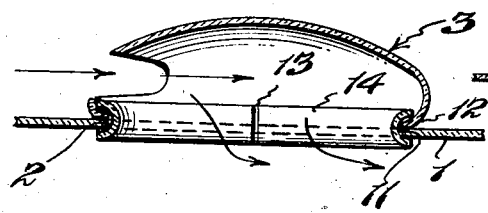
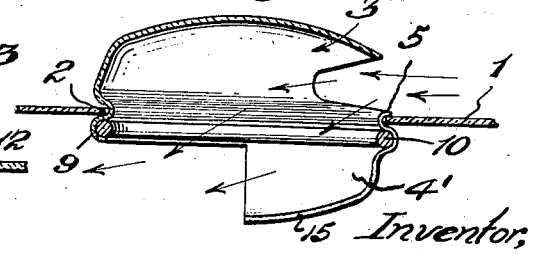
Inventor,
Burton B. Simcox
By: Henry C. Parker
Attorney.

Patented June 16, 1942

2,286,584

UNITED STATES PATENT OFFICE 2,286,584

VENTILATOR FOR AIRPLANES AND THE LIKE

Burton B. Simcox, Knoxville, Tenn.

Application September 11, 1940, Serial No. 356,403

3 Claims. (Cl. 98—9)

This invention relates to ventilators for airplanes and the like; and it comprises a ventilator suitable for installation in the windows or bodies of airplanes, automobiles and other vehicles, said ventilator comprising at least one cup-shaped element constructed of resilient material, having one side cut away to provide a passageway for air and serving as a scoop to collect air from the outside of said vehicle, said element being mounted on the outside of said vehicle in a circular opening cut in the window or body of said vehicle in which opening said element is adapted to rotate, the lip of said cup-shaped element being usually shaped to form a groove providing a bearing surface adapted to receive the edge of said circular opening, the wall of said cup-shaped element being sufficiently resilient to enable this element to be sprung or snapped into position in said circular opening; said cup-shaped element being also provided advantageously with means for locking it in position, said means usually comprising an inwardly curled lip cooperating with a ring adapted to be sprung into said curled lip thereby preventing compression of the wall of said cup-shaped element and removal of the same from its seat. A modified form of the ventilator is constructed with two cup-shaped elements, one being outside and the other inside the vehicle, said elements being advantageously independently rotatable, the lip of one of said elements being shaped in such fashion as to form a bearing surface for the lip of the other of said elements; all as more fully hereinafter set forth and as claimed.

While a large number of different types of ventilators for vehicles have been proposed, few of these have been simple in construction and capable of being readily installed by the purchaser, for example. In addition very few have been constructed in such fashion that both the volume and the direction of the incoming air could be controlled. The advent of privately owned airplanes has greatly increased the demand for ventilators of this general type.

I have developed a ventilator which, in one of its modifications, is believed to be the ultimate in simplicity, since it is made in one part and which, moreover, can be readily installed in a vehicle by anyone who is able to cut a circular hole in the window or body of the vehicle. The cutting of the required circular hole is the only operation requiring any skill since this one-part ventilator can be quickly snapped into place as soon as the hole is cut and its edges trimmed. My modified two-part ventilator can be installed almost as easily, after the circular hole is cut, merely by snapping two parts in place. And this two-part ventilator permits control of both the volume and direction of the incoming air.

My one-part ventilator consists merely in a resilient cup- or scoop-shaped element provided with a cut away section forming an air vent, the inner rim or lip of the cup-shaped element being formed into an annular groove adapted to receive the edge of a circular hole or cutout in the window or body of the vehicle. The lip of this element may extend around the entire edge of the circular hole or around any portion thereof which is greater than half the circumference of the hole. The groove forms a bearing surface for the edge of the circular hole and the cup-shaped element can be readily rotated in order to control the volume of air collected.

In my two-part ventilator an exterior cup-shaped element is also provided which may be of the same construction as that in the one-part ventilator. But a cup-shaped element is provided in the interior of the vehicle which is mounted in the same circular cut-out. The rim of this element is formed, in similar manner, into an annular groove which is congruent with the groove on the rim of the external cup-shaped element. The rim of the inner cup-shaped element is adapted to be snapped inside the rim of the outer cup-shaped element or vice versa, the congruent grooves forming a bearing so that the two parts can be rotated independently. The outer element then controls the volume of the air collected while the inner element controls the direction in which the collected air is thrown in the vehicle.

My ventilator has other advantages aside from its simple structure and ease of mounting. I have found that the outer cup-shaped element of my ventilator, when mounted in the window pane of an airplane, for example, produces enough air resistance to prevent water streaking across the window pane from entering the ventilator in appreciable quantities. The dense air just in front of the ventilator causes such water to divide into two paths flowing on either side of the ventilator without touching the ventilator. In other words the resistance of the ventilator to the air causes the high velocity air stream, which carries the drops of rain across the window, to pass around the ventilator. This prevents most of the water from entering the ventilator. Moreover any rain water directly entering the air duct of the element tends to strike the cup-shaped interior or groove of the element located in the interior of the ventilator just outside the hole in the window. This water collects at this point and, if the air duct is turned so that it opens forwardly and slightly downwardly, it runs out of the ventilator without tending to enter the cabin. The outer cup-shaped element thus acts in effect as an entrainment separator. It is, of course, a great advantage to be able to employ such a ventilator when it is raining.

The ease of removal of my ventilator is of great advantage when it is mounted in a circular hole in the windows and it is desired to clean the windows. The cup-shaped elements can be removed from the hole in the window and can be cleaned separately. The window can be cleaned while free from all obstructions. Most of the prior art airplane ventilators are secured in place by rivets or bolts and are constructed with overlapping flanges under which dirt tends to collect. Removal of such ventilators is difficult and cleaning is troublesome.

My ventilator offers less obstruction to the view than any other type of ventilator for the reason that the faces of the cup-shaped elements can be made plane and on account of the absence of overlapping flanges as well as rivets or bolts, such as are found in prior art ventilators. For this reason my ventilator can be mounted directly in the windows of an airplane without objection. A further advantage of my ventilators over those which have been proposed previously is that they can be constructed very cheaply. And still another advantage is that a person purchasing a one-part ventilator can readily convert this into the two-part type merely by the purchase of the inner cup-shaped element. The inner and outer cup-shaped elements can be made interchangeable.

My invention can be explained in more detail by reference to the accompanying drawing in which the various figures show, more or less diagrammatically, several illustrative embodiments of my ventilator. In this showing, Fig. 1 is a perspective view of my one-piece ventilator taken from the outside of the vehicle, Fig. 2 is an elevation of the ventilator, shown in Fig. 1, from the inside of the vehicle, Fig. 3 is a cross section through the ventilator of Figs. 1 and 2, taken along the line 3—3 of Fig. 2, Fig. 4 is a perspective view of my two-part ventilator taken from the inside of the vehicle, Fig. 5 is a cross section through the two-part ventilator taken along the line 5—5 of Fig. 4, Fig. 6 is a cross section through the center of a modified one-part ventilator, Fig. 7 is a partial section through a device for manipulating the ventilator, taken along the line 7—7 of Fig. 2 in the direction of the arrows, while Fig. 8 is a cross section through the center of a modified one-part ventilator having two air ducts and being equipped with a locking ring.

In the various figures like parts are designated by like reference numerals. The window or body wall of the vehicle is indicated in all figures at 1. This wall is provided at 2 with a circular cut-out which is adapted to receive the cup-shaped element or elements of the ventilator. The external cup-shaped element is shown at 3 and this element is common to all the modifications of the ventilator although, of course, this element may vary rather widely in size and shape. This elements serves as a scoop to collect fresh air for ventilation purposes. The internal cup-shaped element, which may be provided in the ventilator, is shown at 4 in Figs. 4 and 5. This element serves as a means for directing and distributing the collected air in the interior of the vehicle.

The external cup-shaped elements or scoops of the modifications, shown in Figs. 1 to 5 are provided with a rim or lip 5 which is constricted and then curled outwardly thus forming an annular bearing groove adapted to receive the edge of the cut-out. The lips 6 of the inner cup-shaped elements are usually formed into grooves in a similar manner and these grooves are adapted to receive or to bear against the inner ridges formed by the grooves on the external cup-shaped elements, as shown in Figs. 4 and 5.

The outer face of the external cup-shaped element may cover the entire opening of the circular cut-out 2, with the exception of a small air duct, as shown in the various figures, or this face may extend only part way over the cut-out, thus providing a larger air duct. For example this element can be made of substantially the same shape as that of the inner cup-shaped member 4, shown in Fig. 5. The lips of both the outer and the inner cup-shaped members may be cut away, as shown in Fig. 2, in order to provide sufficient resilience for these lips to be compressed when they are inserted into the cut-outs. It is then only necessary to grasp the cup-shaped members with the ends of the fingers on both sides of the air duct and to exert a slight pressure whereby the lips will be compressed as shown by the dotted lines in Fig. 2. When compressed in this fashion the cup-shaped members can be readily inserted in the circular cut-outs. It is advantageous, however, to have the grooved rim of at least the outer cup-shaped member extend around the entire circumference of the cut-out in order to provide a greater bearing surface. This rim should then be slotted or parted at a point adjoining the air duct, as shown at 15 in Fig. 5. The edges of this slot can then be made to overlap, thereby reducing the circumference of the ring, when the element is being inserted or removed from the cut-out.

While the cup-shaped members of this invention can usually be rotated by hand merely by inserting the fingers in the air duct and twisting, it is sometimes convenient to provide other means for rotating these members. This means may take the form of a lug 7, formed integrally with the rim of the external cup-shaped element, as shown in Figs. 2, 3 and 7, which is provided with an upstanding fin 8 which may be grasped by the fingers.

In Fig. 6 a modified mounting for the ventilator is shown. In this modification a ring 14 is provided having a circumferential recess 11 adapted to receive both the edge of the circular cut-out as well as the lip of either one or two cup-shaped elements. The ring is advantageously split at one point, as at 13, in order that it may be inserted in the cut-out without difficulty. The cup-shaped elements which cooperate with this ring have their lips or rims 12 bent inwardly in such fashion that they can be sprung over the outer flange of the recessed ring 14. The recess 11 of the ring 14 then forms a bearing surface for the rims 12 of the cup-shaped elements, as is evident from the showing of Fig. 6.

In its simplest form my ventilator is made in one piece and with a single air duct, as shown in Figs. 1 to 3. A modified one-piece ventilator provided with two air ducts is shown in Fig. 8. This figure shows also a locking means which is applicable to any of the various modifications. This locking means is in the form of a ring 10 which is sprung into a recess formed in the lip 9 just inside the window. This ring prevents removal of the ventilator from outside the vehicle since the edges of the outer cup-shaped element cannot be compressed while the ring is in position. To remove a ventilator provided with a locking ring of the type shown it is necessary first to remove the ring by using a screw driver from the inside of the vehicle and then to go outside the vehicle to compress the sides of the cup-shaped member, thereby effecting removal. Such a device thus effectively prevents tampering or theft.

The modified one-piece ventilator with two air ducts, shown in Fig. 8, must be provided with a slot, such as that shown at 15, in order that it may be inserted and removed from its seat. If the edges of the outer cup-shaped element 3' are compressed on either side of the outer air duct, the edges of the slot 15 can be made to overlap and this reduces the circumference of the inner cup-shaped element 4' to such an extent that it can be readily inserted in the cut-out. Removal is effected by the same method.

While the ventilator of this invention can be constructed of metal or of any other type of resilient material, when it is employed in the windows of an airplane or automobile, for example, it is usually desired that the vision be impaired as little as possible. It is therefore usually advantageous to construct such ventilators of a transparent plastic, such as cellulose acetate, pyralin or Celluloid, for example. If constructed of such a material and if the faces of the cup-shaped members are provided with plane surfaces, the vision is scarcely impaired except for a narrow ring around the outer edge of the ventilator.

It is believed to be evident that my ventilator may be constructed by several different methods. It can be molded directly from one of the usual plastic molding powders, for example. A method which is equally applicable, for the production of the modifications shown in Figs. 1 to 5 and 6, is to form the cup-shaped elements from a plastic sheet, pressing the sheet between heated dies of suitable shape. In this operation it is usually advantageous to heat the sheet to a plastic condition just before it is inserted in the dies. While the plastic sheet is drawn to some extent during this die-forming operation, this is not objectionable and the cup-shaped elements produced in this manner are structurally strong. It is also possible to construct the modification shown in Fig. 8 from a hollow sphere of plastic material by first compressing the sphere between dies into substantially the form of a short cylinder, then forming the annular groove about the circumference of the cylinder, cutting away portions to form the air ducts and finally cutting the slot 15.

It is evident that the present invention provides a ventilator of very simple construction, which can be easily installed, which causes a minimum obstruction to the view and which has a very neat appearance. Other advantages are that it is substantially water tight, that it does not tend to scratch or wear the surface of the window in which it may be installed and that it is easily cleaned. Furthermore, owing to the fact that it is held in seated position by the resilience of the material from which it is constructed, vibration will not cause it to rotate out of the position in which it is once set.

While I have described what I consider to be the best modifications of my ventilator, it is evident that various changes can be made in the structure of the parts without departing from the purview of this invention. For example, if it is desired to install my ventilator more or less permanently, this can be accomplished, in the case of the modifications shown in Figs. 5 and 8, by filling the slot 15 with some type of cement. This effectively prevents removal of the ventilator. A cellulose acetate cement can be employed if the cup-shaped elements are constructed of cellulose acetate, for example. The inner cup-shaped element can be constructed in substantially any desired shape, while the shape of the outer element is restricted, at least in the case of airplanes, by the requirement that the ventilator have a low air resistance. It is evident that my ventilators can be mounted in any of the windows or in any other part of the vehicle body. They can be mounted with the scoop element either extending outside the space to be ventilated or merely into an air duct of a heating and ventilating system, such as are used on transport airplanes, buses, trains and also in buildings. They can be made of any desired size. For airplanes I have found it advantageous to make the circular cut-out in the window about 2 inches in diameter, the outer cup-shaped element extending not more than about ¾ inch beyond the body of the plane. The body portions of the cup-shaped elements of my ventilator may be constructed of more or less rigid material, since it is necessary only that the rim portions of these elements be sufficiently resilient for ready insertion and removal. In the case of my one-part ventilators it is possible to install them with their cup-shaped portions either outside or inside the vehicle, depending upon the amount of ventilation desired. Other modifications of this invention which fall within the scope of the following claims will be immediately evident to those skilled in this art.

What I claim is:

1. A ventilator adapted to be tensionally and rotatably held in a circular hole in the enclosing wall of a vehicle comprising a dome-shaped member of flexible material and having a constriction forming an exterior peripheral groove near its base, the base flaring outwardly, one side of the base and dome portions being open for less than 180 degrees, the base being a segment of a circle occupying more than 180 degrees so that the base can be compressed at its open side to be inserted into the circular hole in the walls of a vehicle and whereby the bottom of the groove will fit against the walls of the hole and the inherent resiliency of the member will hold the member in frictional and rotative engagement with the walls of the hole.

2. A ventilator adapted to be rotatably positioned in a circular hole in a wall of a vehicle and having the major portion thereof disposed on the exterior of the vehicle, said ventilator comprising a dome-shaped resilient member constricted adjacent its base and having its base outwardly flared from said constricted portion to form an exterior peripheral groove, one side of the dome-shaped member together with its base being open for less than half the circumference of the member so that the member and its base may be flexed inwardly to pass the base through a hole in the wall of a vehicle and whereby when the pressure on the base is released the inherent resiliency of the material will cause the walls of the hole to be engaged by the bottom of the peripheral groove to hold the member in position.

3. A ventilator adapted to be rotatably mounted in a circular hole in the walls of the passenger compartment of a vehicle and comprising a cup-shaped member having one side open to form a scoop on the exterior of the vehicle when the rim of the cup-shaped member is disposed in said hole, the member being of resilient material and having the rim also open to allow the base, to be constricted to be inserted in the hole, the member being constricted near its rim and having its rim portion flared outwardly to thereby form a peripheral groove to rotatably fit against the sidewalls of the hole when the member is inserted from the outside of the vehicle into the hole.

BURTON B. SIMCOX.